(12) United States Patent
Schmieg

(10) Patent No.: US 12,239,263 B2
(45) Date of Patent: Mar. 4, 2025

(54) RECEPTACLE

(71) Applicant: Daniel Schmieg, Fellbach (DE)

(72) Inventor: Daniel Schmieg, Fellbach (DE)

( * ) Notice: Subject to any disclaimer, the term of this patent is extended or adjusted under 35 U.S.C. 154(b) by 12 days.

(21) Appl. No.: 17/799,735

(22) PCT Filed: Feb. 11, 2021

(86) PCT No.: PCT/EP2021/000016
§ 371 (c)(1),
(2) Date: Dec. 20, 2022

(87) PCT Pub. No.: WO2021/164933
PCT Pub. Date: Aug. 26, 2021

(65) Prior Publication Data
US 2023/0210312 A1  Jul. 6, 2023

(30) Foreign Application Priority Data
Feb. 18, 2020 (DE) .................. 20 2020 000 857.5

(51) Int. Cl.
*A47J 47/10* (2006.01)
*B65D 21/02* (2006.01)
*B65D 51/16* (2006.01)

(52) U.S. Cl.
CPC .......... *A47J 47/10* (2013.01); *B65D 21/0219* (2013.01); *B65D 51/1683* (2013.01); *B65D 2543/00092* (2013.01); *B65D 2543/00407* (2013.01)

(58) Field of Classification Search
CPC ......... B65D 47/263; B65D 2543/00407; A47J 47/10

USPC ....................................................... 220/253
See application file for complete search history.

(56) References Cited

U.S. PATENT DOCUMENTS

| | | | |
|---|---|---|---|
| 1,714,368 A | | 5/1929 | Hobson |
| 2,860,821 A | * | 11/1958 | Hartung ............... B65D 47/242 |
| | | | 222/519 |
| 3,949,897 A | * | 4/1976 | Shaw .................. B65D 51/1683 |
| | | | 220/756 |

(Continued)

FOREIGN PATENT DOCUMENTS

| | | |
|---|---|---|
| CH | 498 608 | 11/1970 |
| DE | 20 2008 007 208 | 9/2008 |

(Continued)

*Primary Examiner* — Jeffrey R Allen
(74) *Attorney, Agent, or Firm* — Gudrun E. Huckett

(57) ABSTRACT

The receptacle has a container (1) which is intended for receiving products that form condensation when warm, for example food products or the like, and which can be closed by a lid (2). In order that the container (1) can be closed and placed in the refrigerator for cooling and storage purposes straight after being filled with the still-warm product, the receptacle has at least one opening (3), which is provided in an annular wall (11) of the lid (2) and can be closed by at least one closure part (4). In the fitted position, the lid (2) and/or the closure part (4) can be adjusted relative to one another. If warm products, for example warm food products, are introduced into the receptacle, then the opening (3) is at least partly opened, so that, as the warm product cools down, the steam which forms can escape. This prevents any relatively large quantities of condensation from forming in the container.

20 Claims, 11 Drawing Sheets

(56) References Cited

U.S. PATENT DOCUMENTS

| | | | | |
|---|---|---|---|---|
| 4,544,063 A * | 10/1985 | Neward | ............... | B65D 47/263 |
| | | | | 220/253 |
| 7,007,818 B2 * | 3/2006 | Martin | ................... | A47J 47/04 |
| | | | | 206/818 |
| 7,438,204 B2 * | 10/2008 | Conway | ................. | B65D 51/18 |
| | | | | 220/253 |
| 2009/0127261 A1 * | 5/2009 | Perucci | ............. | B65D 43/0222 |
| | | | | 220/315 |
| 2020/0002062 A1 | 1/2020 | Liu | | |

FOREIGN PATENT DOCUMENTS

| | | |
|---|---|---|
| GB | 1 213 969 | 11/1970 |
| WO | 2013/041896 | 3/2013 |

* cited by examiner

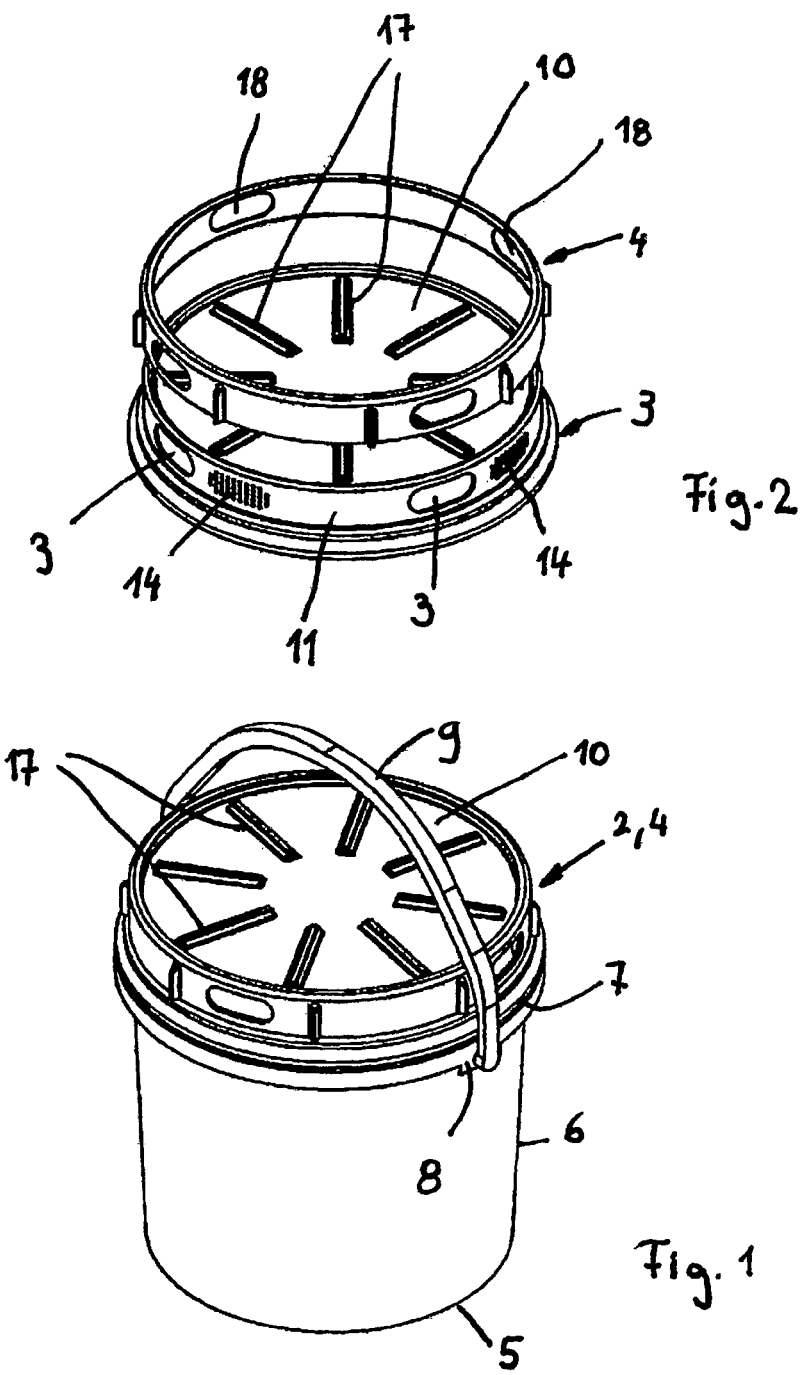

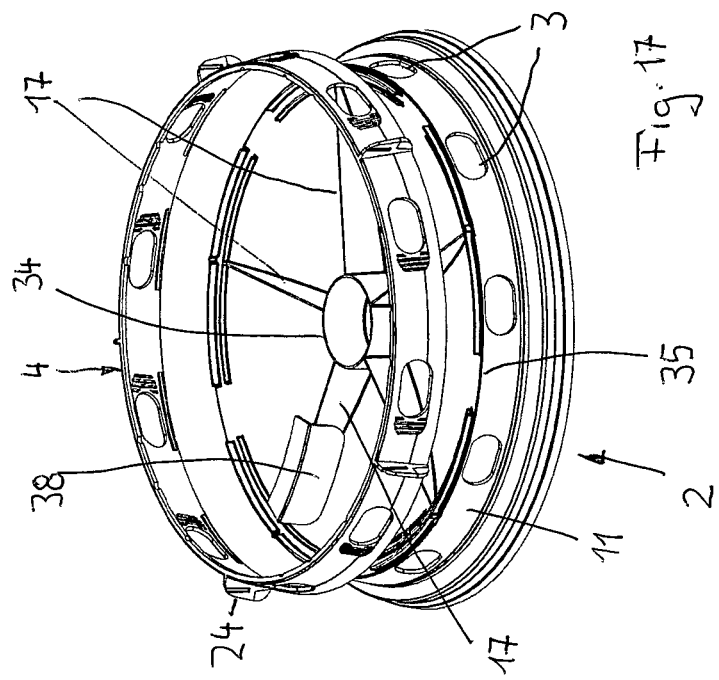
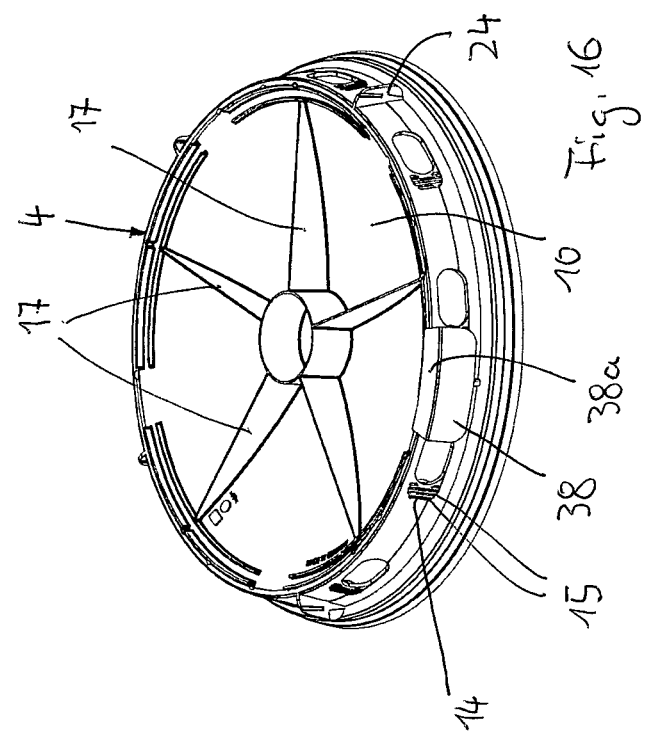

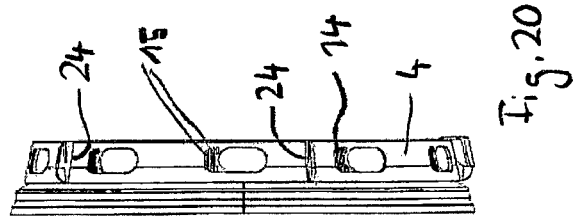
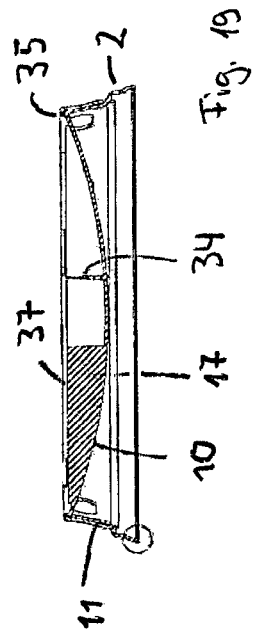
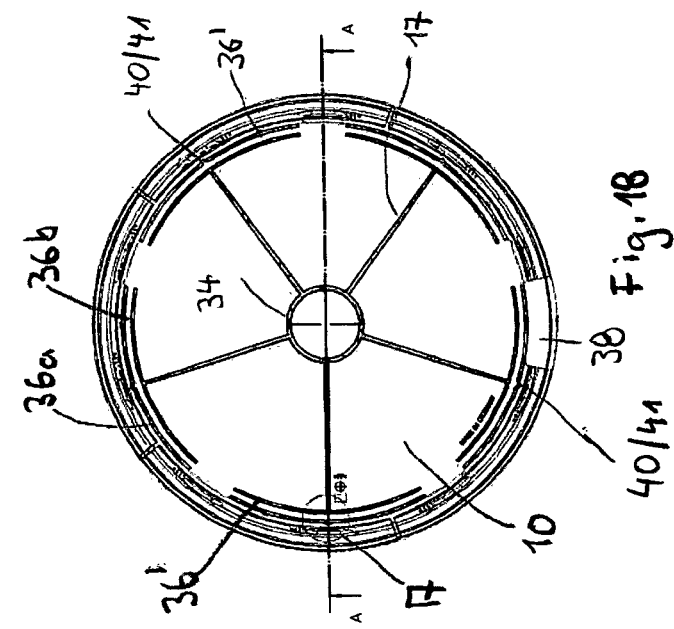
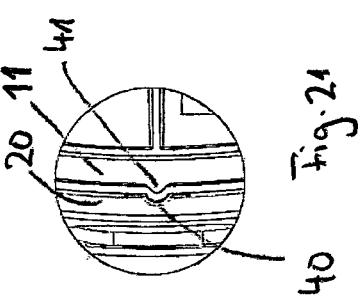

RECEPTACLE

BACKGROUND OF THE INVENTION

The invention concerns a receptacle with a container for receiving products that in case of heat produce condensate, such as food or the like, which can be closed by a lid.

Such receptacles serve for storing hot food, for example, in restaurant operation or in a private home. For this purpose, the still hot food is filled into the containers and placed unclosed into a cold store. The containers however cannot be covered, for example, by a film because then condensate will form that can reach the food. A disadvantage is also that dust and dirt particles which may deteriorate the quality of the food can reach the food via the open containers.

Since the open containers with the hot food cannot be closed, they must be placed and stored in the cold store next to each other and one behind the other. Therefore, the storage space in the cold store cannot be optimally utilized.

It is therefore the object of the invention to configure the receptacle such that it can be closed immediately after filling with the still hot product and placed into the cooling device for cooling and storage.

SUMMARY OF THE INVENTION

This object is solved for the receptacle of the aforementioned kind in accordance with the invention in that the receptacle comprises at least one opening provided in an annular wall of the lid which can be closed by at least one closure part, and in that the lid and/or the closure part are adjustable relative to each other in mounted position.

The receptacle according to the invention has at an annular wall of the lid at least one opening which is located in the annular wall of the lid and which can be closed by at least one closure part. The lid and/or the closure part are adjustable relative to each other for this purpose. When hot products, such as hot food, are filled into the receptacle, then the opening is at least partially released so that upon cooling of the hot product the steam which is forming can escape. In this manner, it is prevented that larger quantities of condensate form in the container. The condensate which is formed despite venting is produced in such a minimal quantity that it has no longer an effect on the quality of the product. After the hot food has cooled, the opening of the receptacle can be closed by means of the closure part. Since the opening of the receptacle is provided in the lid, the container can remain free of openings so that the products in the container are protected from penetration of dirt particles from the exterior. Since the opening is not provided at the lid bottom but at the wall of the lid, there is the possibility to place a further receptacle on the lid. This additional receptacle then does not cover the opening provided in the annular wall so that even for receptacles stacked on each other it is ensured that the container with the hot product contained therein can be cooled. Since the opening is located in the annular wall, the opening can be closed or opened at any time by means of the closure part even when the receptacles are stacked on each other.

Since the container with the hot product contained therein can be closed, a plurality of containers can be stacked on each other. In this way, a significantly higher number of containers can be accommodated in the cooling device than before so that its storage space can be optimally utilized.

A particularly advantageous embodiment results when the closure part also comprises at least one opening. Then, the closure part can be brought into such a position that its opening at least partially, as needed also completely, releases the opening of the lid.

It is preferred when this opening is provided in an annular wall of the closure part. The annular wall enables a space-saving construction.

Advantageously, the annular wall of the closure part surrounds the annular wall of the lid. In this way, it is possible to open and close the opening of the receptacle even when the receptacles are stacked on each other. The annular closure part can then be easily actuated.

The closure part is preferably supported on the lid so as to be rotatable. In this way, the opening of the receptacle can be opened or closed simply by rotation of the closure part.

When the lid comprises in addition to the opening at least one venting region which can be closed by the closure part, an optimal adaptation of the opening cross section to the condensate produced in the receptacle while the product cools down is possible. The venting region is comprised in an exemplary fashion of a plurality of small adjacently positioned openings whose opening cross section in total is smaller than the opening cross section of the venting opening of the receptacle.

In this context, the opening and the venting region can be provided such that with the closure part the opening as well as the venting region can be closed. Furthermore, it is possible to release with the closure part only the venting region while keeping the opening itself still closed. This is advantageous, for example, when the product in the receptacle is not heated very much so that only little condensate is formed when cooling down. Then the outlet cross section formed by the venting region is sufficient for the steam.

When the products are very strongly heated, then the closure part is adjusted such that the opening with the large opening cross section is released. Then the steam that forms while the heated product cools can reliably escape through the large opening to the exterior.

The opening in the receptacle, preferably in the annular wall of the lid, has an oval contour in an advantageous embodiment.

Advantageously, the opening in the lid extends in circumferential direction of its annular wall. It can therefore have a minimal height because in circumferential direction of the annular wall there exists sufficient space for the opening. In this way, the lid itself can comprise also only a minimal height.

When the annular wall and/or the bottom of the lid comprises at least one, preferably however a plurality of reinforcement parts arranged at a spacing from each other, the lid has a sufficient strength in order to place thereon at least one further receptacle.

The reinforcement parts of the bottom of the lid are located at its outer side and radiate preferably inwardly away from the annular wall.

The lid is advantageously provided with a raised rim which delimits a storage surface for a receptacle placeable onto the lid. The raised rim not only increases the stiffness of the lid but also provides an anti-slide protection for the receptacle placed onto the lid.

In the region between the opening and the venting region, at least one reinforcement part is advantageously provided in the annular wall of the lid. The lid is provided in this way with a sufficiently high strength so that without additional preventive measures it can be used reliably in daily use.

A safe seat of the closure part on the lid results in an advantageous manner when the closure part at the rim of the annular wall which is facing the container comprises an annular, circumferentially extending projection which engages an annular groove in the exterior side of the annular wall of the lid.

It is advantageous when the rim of the closure part which is facing away from the container is angled radially inwardly and resting on the rim of the lid.

The subject matter of the application not only results from the subject matter of the individual claims but also from all specifications and features disclosed in the drawings and the description. They are, even if they are not subject matter of the claims, claimed as being important to the invention, provided they, individually or in combination, are novel relative to the prior art.

Further features of the invention result from the additional claims, the description, and the drawings.

BRIEF DESCRIPTION OF THE DRAWINGS

The invention will be explained in more detail with the aid of two embodiments illustrated in the drawing. It is shown in:

FIG. 1 a receptacle according to the invention with a container, a lid, and a closure part in perspective illustration;

FIG. 2 the lid and the closure part in exploded illustration;

FIG. 16 in perspective illustration a second embodiment of a lid of the receptacle according to the invention with a closure part;

FIG. 17 the lid and the closure part according to FIG. 16 in a position detached from each other;

FIG. 18 a plan view of the lid with closure part according to FIG. 16;

FIG. 19 a section along the line A-A in FIG. 18;

FIG. 20 a side view of the lid with closure part according to FIG. 16;

FIG. 21 in enlarged illustration the detail A in FIG. 18.

DESCRIPTION OF PREFERRED EMBODIMENTS

Figure 8:
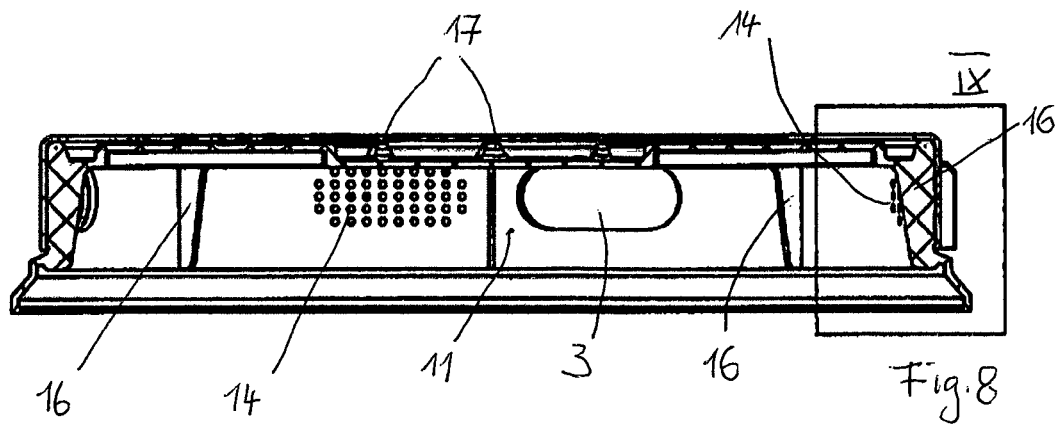
FIG. 8 a section along the line VIII-VIII in FIG. 7.
Figure 9:
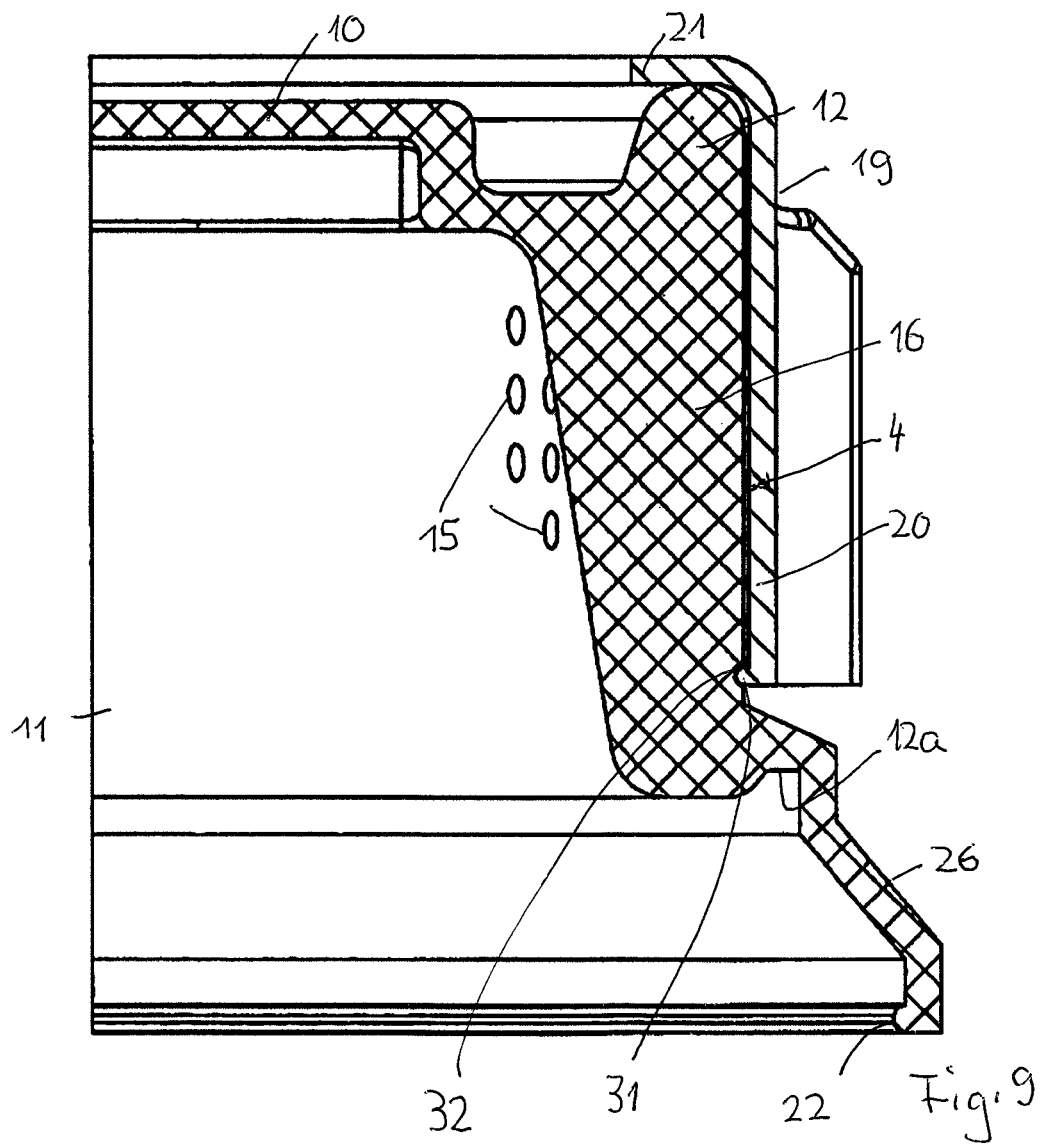
FIG. 9 the detail IX in FIG. 8 in enlarged illustration.
Figure 14:
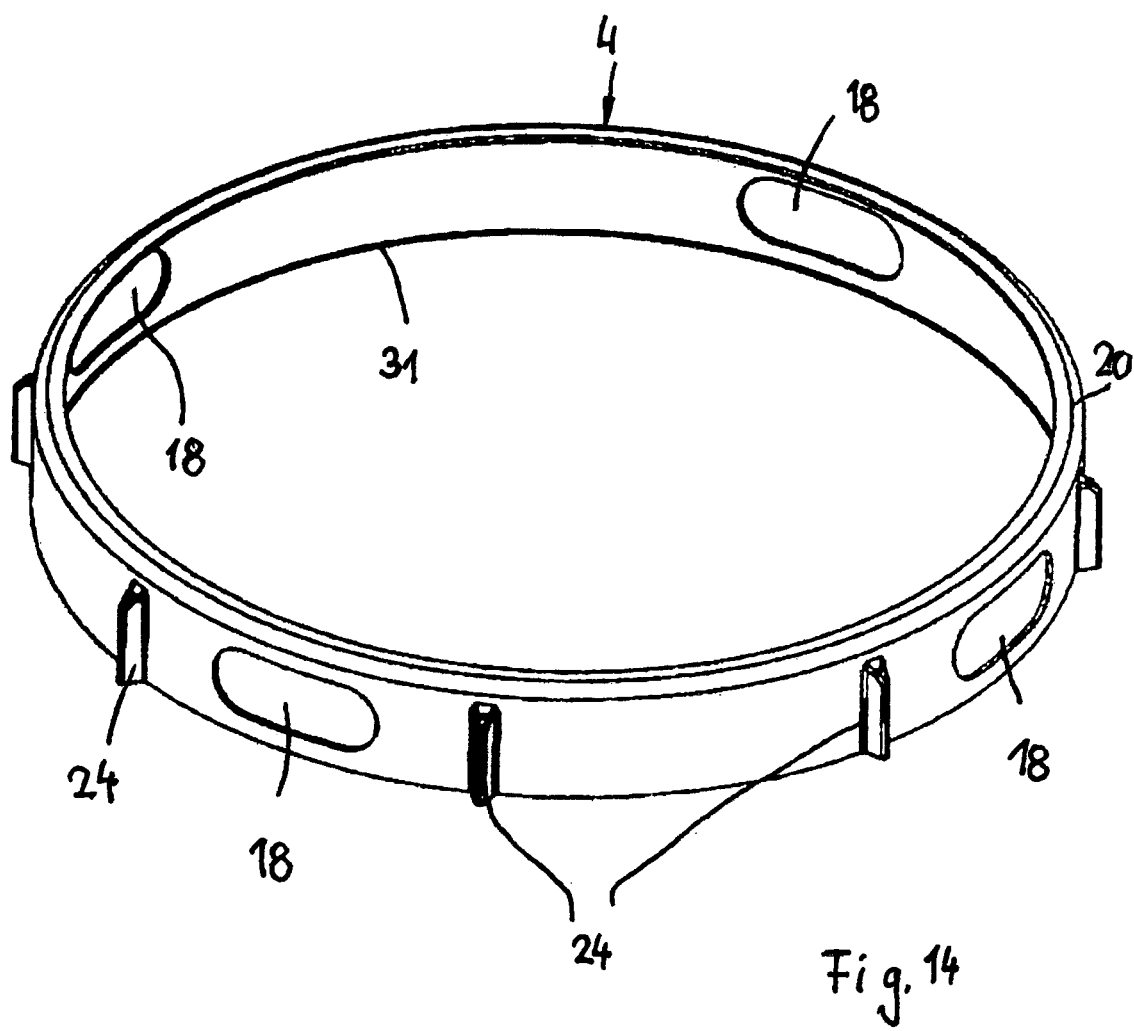
FIG. 14 in enlarged and perspective illustration the closure part.
Figure 15:
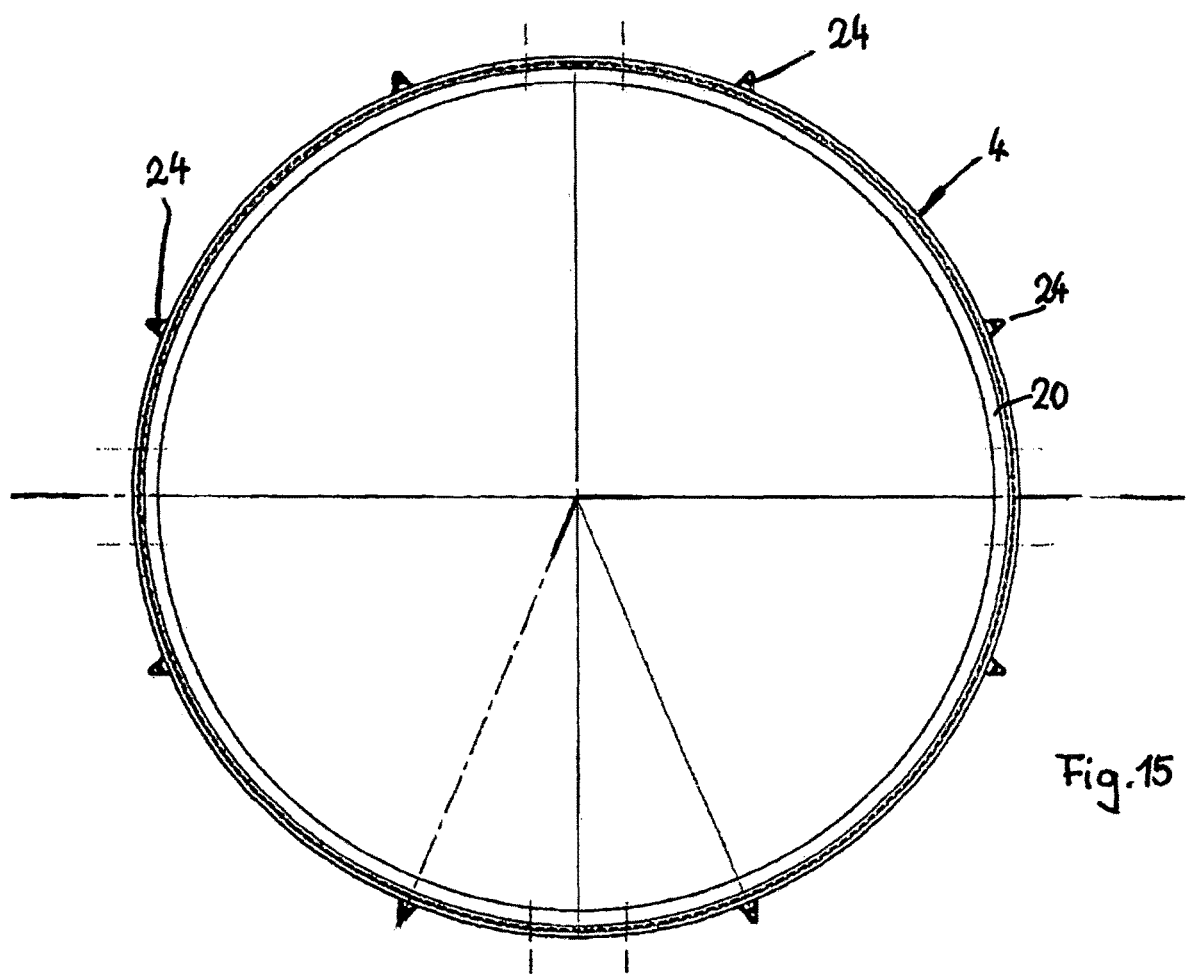
FIG. 15 a plan view of the closure part according to FIG. 14.

FIGS. 1 and 2 show the receptacle with a container 1 and with a lid 2 which comprises at least one, preferably a plurality of venting openings 3 which can be closed by a closure part 4. The closure part 4, like the lid 2, has at least one, preferably a plurality of venting openings 18 (FIGS. 8, 9, 14). For example, steam which is produced when hot food or the like cools in the container 1 can escape therefrom through the openings 3, 18, when they are positioned congruent to each other, whereby it is prevented that larger quantities of condensate reach the food.

The closure part 4, when it is arranged on the lid 2, can be rotated relative thereto from an open position, in which the lid openings 3 are not covered, into a closed position in order to partially or completely close the openings 3.

As containers, any type of container, also generally known containers such as buckets or other similar vessels, can be employed.

Figure 3:
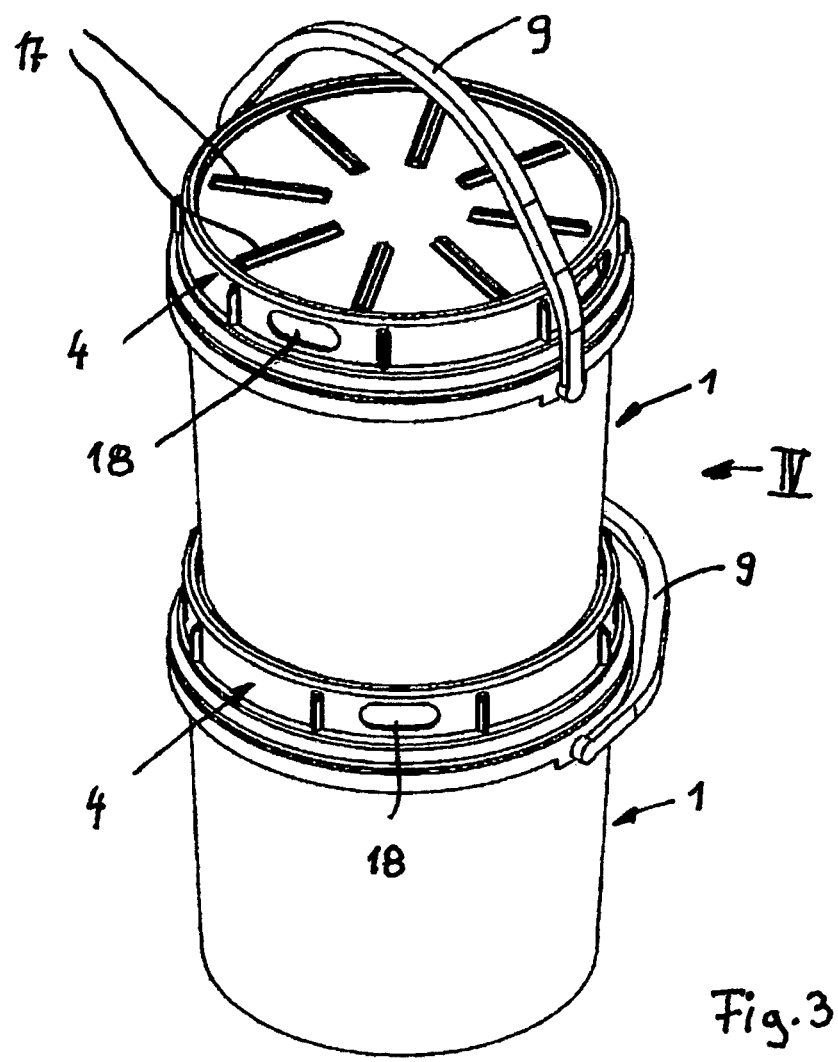
FIG. 3 two receptacles according to the invention which are stacked on each other in a representation corresponding to FIG. 1.
Figure 4:
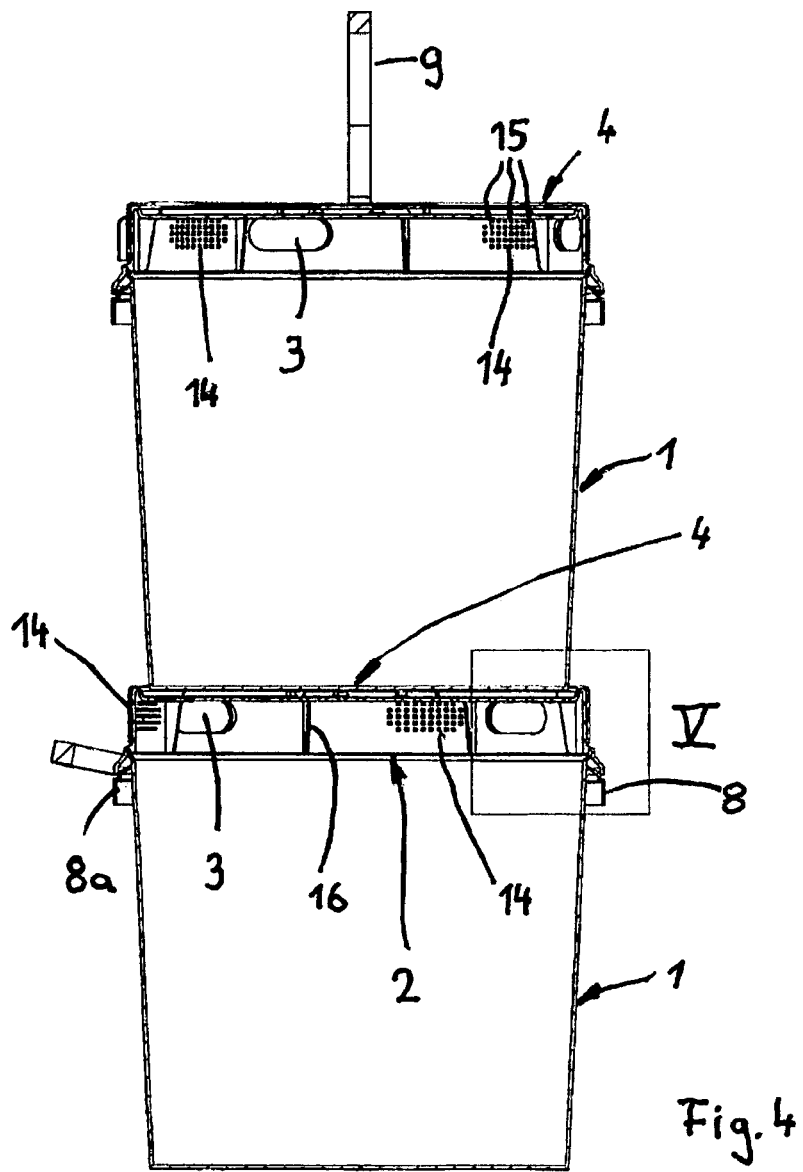
FIG. 4 a view in the direction of the arrow IV in FIG. 3.
Figure 5:
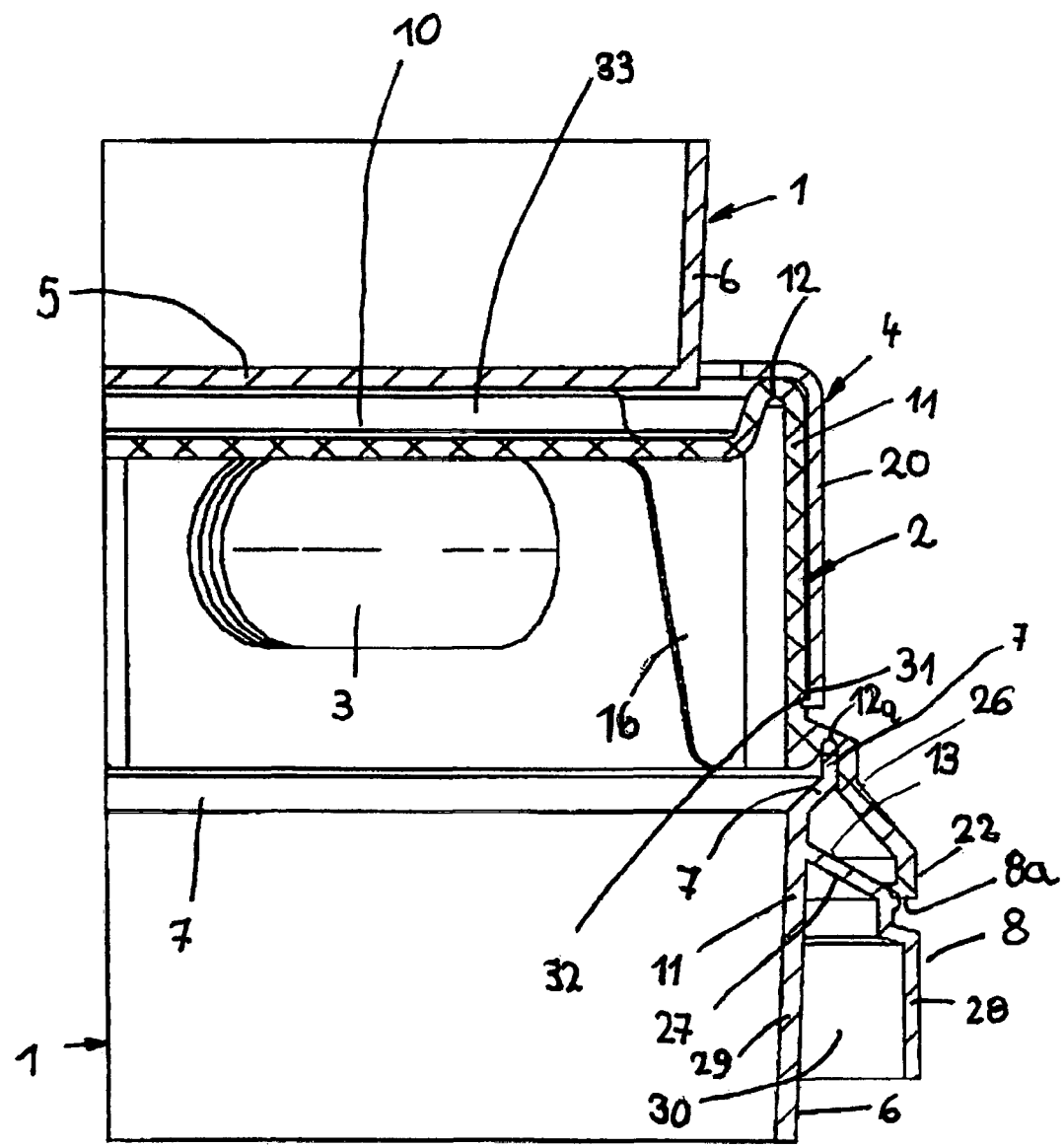
FIG. 5 the detail V in FIG. 4 in an enlarged illustration.
Figure 6:
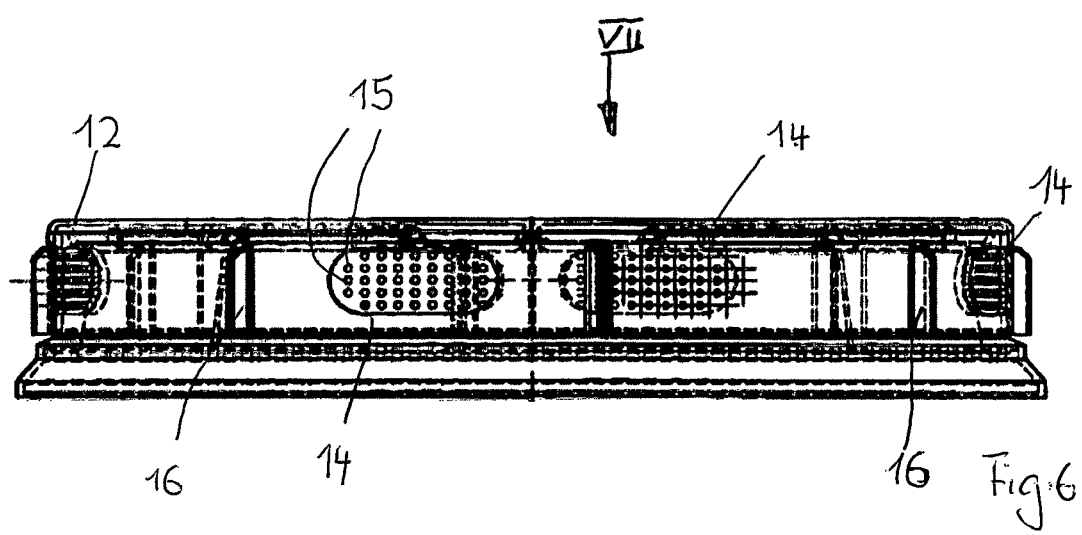
FIG. 6 the lid according to FIG. 2 with attached closure part in side view.
Figure 7:
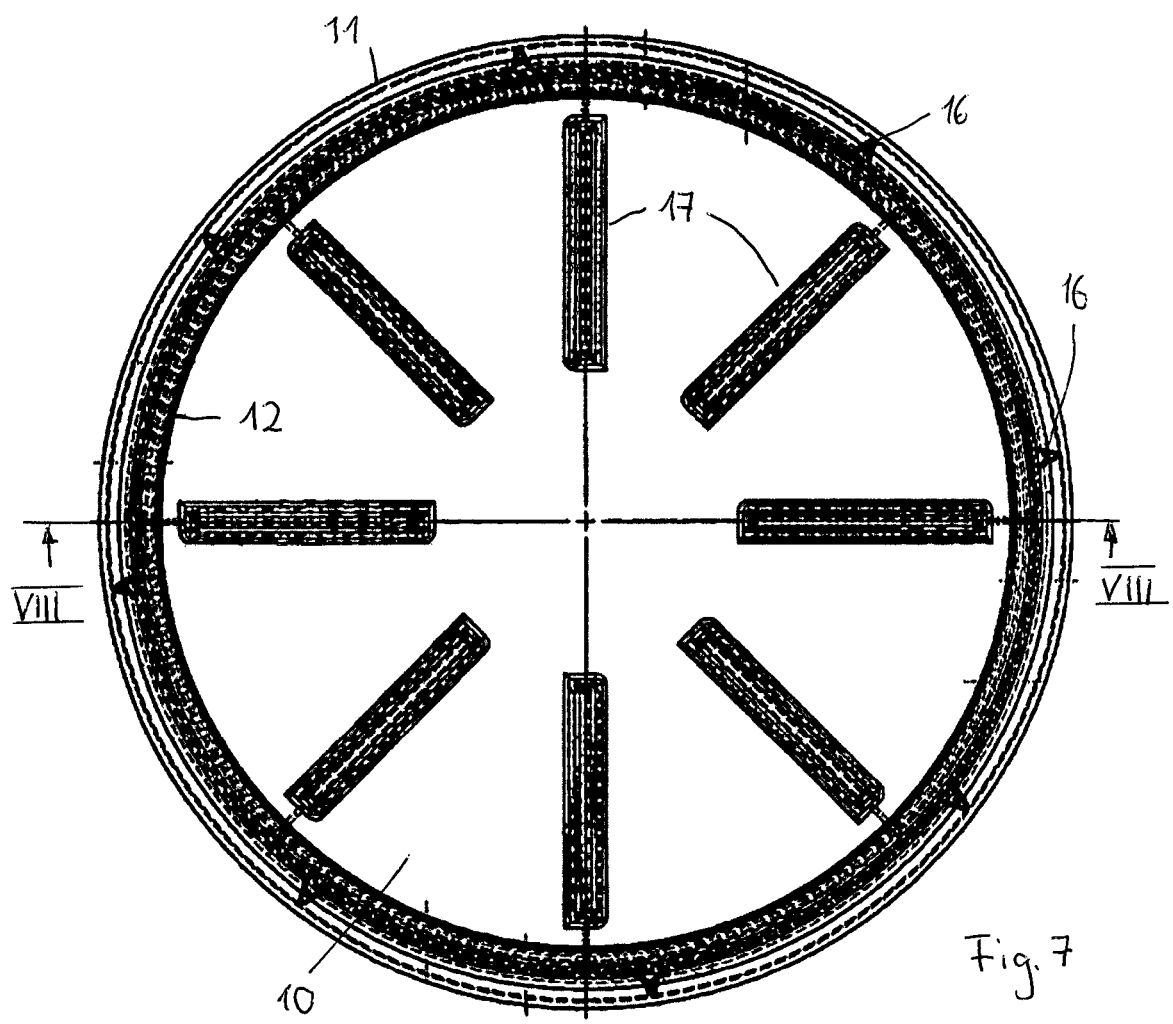
FIG. 7 a plan view according to VII in FIG. 6.

The illustrated container 1 has a bottom 5 and a wall 6 which widens advantageously slightly conically in upward direction with a free shoulder-shaped outwardly projecting rim 7 (FIG. 5). When the lid 2 is attached, the container rim 7 with an outer rim section 7a projects into a corresponding annular groove 12a of the lid 2 (FIG. 5). In this position, the lid 2 can be secured on the container 1. For this purpose, the container 1 has at two locations diametrically opposed to each other on the outer side of the container wall 6, with advantageously minimal distance below the container rim 7, two preferably identically embodied tab-like holding parts 8, 8a (FIG. 4) at which the lid 2 can be held in attached position on the container 1. At the holding parts 8, 8a, a carrying handle 9 for the container 1 can be fastened additionally (FIGS. 1, 3). As can be seen in particular in FIG. 5 with the aid of a holding part 8, the holding parts 8, 8a have a profile section 13, approximately angular in longitudinal section, with an outwardly open groove 13a into which the lid 2 projects with its rim-side form fit part 22 in its closed position (FIG. 5).

The holding parts 8, 8a have the profile section 13 (FIG. 5) which comprises a slanted connection part 27 which projects from the container wall 6 at a slant downwardly in direction toward the container bottom 5 and passes into a downwardly extending holding section 28. It delimits, together with the connection part 27 and sidewalls 29, a receiving chamber 30.

The carrying handle 9 (FIG. 1) is supported with its free ends by means of fastening means (not illustrated) pivotably at the holding sections 28. The fastening means can be accommodated so as to be protected and invisible in the receiving chamber 30.

The lid 2 has a bottom 10 which passes into a cylindrical wall 11 by means of an upwardly projecting rim 12 which is approximately V-shaped in cross section (FIGS. 5, 9, 11, and 13). In this wall, the openings 3 are provided which extend in circumferential direction of the wall 11 and are approximately of an oval configuration. They have advantageously the same circumferential distance from each other and are each identically configured. At a minimal distance next to these openings 3, respective venting regions 14 with a plurality of small holes 15, arranged uniformly distributed, are provided which also serve for venting the container 1 (FIGS. 6, 8, 9 to 11, and 13).

The wall 11 at its free rim is provided with a conically widening rim section 26 which surrounds the container 1 at the upper rim at a distance. At the transition of the rim section 26 into the cylindrical wall 11, the circumferentially extending annular groove 12a is provided at the inner side which is facing the container 1.

At the free end of the rim section 26, the annular circumferentially extending form-fit part 22 is located which extends radially inwardly in the direction toward the container 1 and is designed as a flat projection. In cross section, it is advantageously of a part-circular configuration so that the form-fit part 22 can easily move into the annular groove 13a of the container 1.

Figure 11:
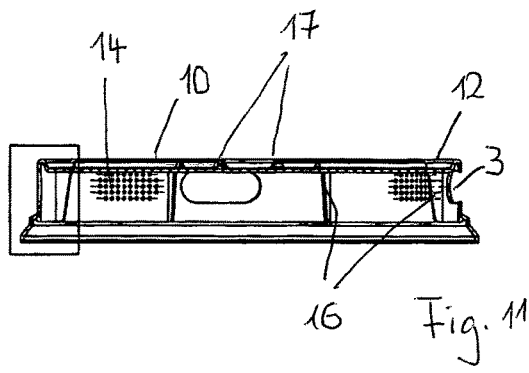
FIG. 11 a section along the line XI-XI in FIG. 10.
Figure 13:
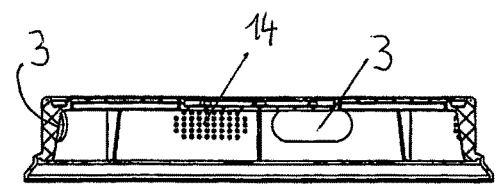
FIG. 13 a section along the line XIII-XIII in FIG. 12.
Figure 10:
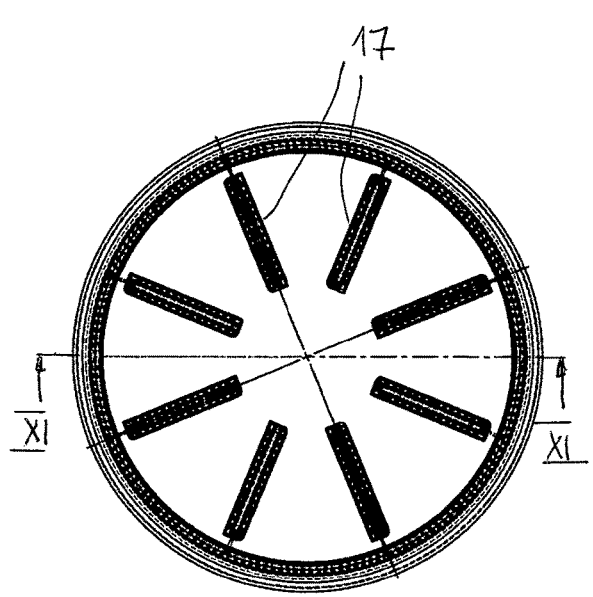
FIG. 10 a plan view of the lid according to FIG. 2.
Figure 12:
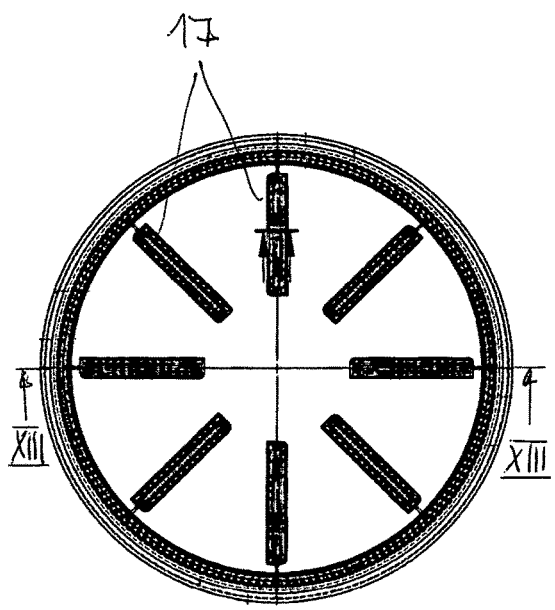
FIG. 12 an illustration corresponding to FIG. 10 wherein the lid assumes a position rotated relative to the illustration of FIG. 10.

The wall 11 has at its inner side narrow rib-shaped reinforcements 16 (FIGS. 6, 8, 11, and 13) which are preferably distributed at the same circumferential distance from each other and extend substantially across the entire height of the wall. In the region between two openings 3 which are provided one after the other in the circumferential direction, for example, two ribs 16 are provided, respectively. The ribs 16 contribute to a high bending stiffness of the wall 11 (FIGS. 11, 13).

A plurality of reinforcement ribs 17 serve for reinforcement of the lid bottom 10 and are provided on its exterior side. They extend approximately away from the lid rim 12 across more than half the radial width of the lid bottom 10 and have advantageously approximately the same distance from each other. Due to the reinforcement ribs 17, the bottom is imparted with a high bending stiffness so that a deformation of the lid bottom is prevented even when one or a plurality of additional containers 1 are stacked on the lid, as illustrated in FIGS. 3 to 5.

Advantageously, the lid wall 11 has at its outer side a rib (not illustrated) which is correlated with a groove (not illustrated) at the inner side of the wall 20 of the closure part 4. In its closed position, the rib of the lid 2 is positioned in the groove of the closure part so that the user upon rotation of the closure part 4 in a simple manner recognizes that he has reached the closed position during rotation of the closure part 4. The rib and the groove have only a relatively minimal thickness or depth so that the closure part 4 for opening the openings 3 can be rotated without particular force expenditure from the closed into the release position of the openings 3 of the lid 2.

The wall 20 of the closure part 4 has a rim 21, in the drawing at the top, which is approximately rectangularly bent toward the interior. With the rim 21, the closure part 4 is resting on the lid rim 12 in its position arranged on the lid 2.

In the wall 20 of the closure part 4, the venting openings 18 are provided which are preferably of the same configuration and arranged in the same manner as the openings 3 in the lid wall 11.

At the outer side of the wall 20 of the closure part 4, a plurality of ribs 24 are provided which are preferably arranged at the same circumferential distance one behind the other and which extend substantially across the entire height of the wall 20. These ribs 24 serve for wall reinforcement and can also serve as grip when the closure part 4 is to be rotated relative to the lid 2. As illustrated in FIG. 14, two ribs 24 can be provided, respectively, between the openings 18.

The wall 20 at its rim which in the installed position is facing the container 1 is provided with a radially inwardly projecting annular rib projection 31 (FIGS. 5, 8, and 14) which engages an annular groove 32 in the outer side of the wall 11 of the lid 2. This form fit connection 31, 32 prevents an easy removal of the closure part 4 from the lid 2.

The closure part 4 can be rotated about its axis out of the closed position on the lid 2 such that the openings 18 of the closure part 4 first release only the venting regions 14, but keep the openings 3 still closed. Upon further rotation, the openings 18 move into the region of the openings 3 of the lid 2.

The openings 18 of the closure part 4 are designed such that, depending on the angle of rotation, they can release a portion of the venting regions 14 and a portion of the openings 3 of the lid 2. Finally, the closure part 4 can be rotated so far that the openings 18 close the venting regions 14 and completely release the openings 3.

In this manner, the degree of venting of the container 1 can be adjusted almost continuously. Depending on the heat of the food located in the container 1, the closure part 4 can be adjusted such that only at most a minimal quantity of condensate is formed which does not lead to an impairment of the food in the container.

Since the closure part 4 surrounds the lid 2 and the lid bottom 10 comprises a recess 33 as a result of the circumferentially extending raised rim 12 (FIG. 5), the containers 1 can be stacked on each other and the closure parts 4 can still be adjusted. The containers 1 are seated with their bottom 5 in the recess 33 of the respective container 1 underneath.

Advantageously, all parts of the receptacle, i.e., the container 1, the lid 2, and the closure part 4, are each manufactured as one piece of plastic material. They can, of course, be comprised also of any other suitable material, e.g. metal, which has a relatively high stiffness and durability end fulfills the hygiene specifications for storage of food.

FIGS. 16 to 21 show a second embodiment of a lid 2 and of the closure part 4. The lid 2 is connected in the same manner as in the preceding embodiment to the container 1.

The lid 2 has the closed bottom 10 which, in contrast to the preceding embodiment, is preferably convexly curved downwardly in direction toward the container 1 starting at the wall 11. As can be seen in FIG. 19, the bottom 10 can be continuously curved in section.

In this way, condensate which can form as the food contained in the container 1 cools down can easily and quickly flow down along the lid bottom 10 and evaporate.

The wall 11 is advantageously conically designed. Its diameter decreases starting at the bottom 10 so that it has its smallest diameter at the free rim.

Centrally on the bottom 10, a cylindrical annular part 34 is provided which advantageously is embodied as one piece together with the bottom 10. It is only so tall that it does not project in axial direction of the lid 2 past the free rim 35 of the wall 11. In this way, the described stackability of the receptacles is not impaired.

The reinforcement ribs 17 adjoin the annular part 34 and, in radial direction, extend to a position close to the guide 36 which is provided on the bottom 10 with minimal distance to the wall 11 (FIG. 18). The reinforcement ribs 17 extend away from the bottom 10 in axial planes. Since the bottom 10 has a curved extension, the height of the reinforcement ribs 17 decreases away from the annular part 34 (FIG. 19). The free rim 37 of the reinforcement ribs 17 is located together with the free rim 35 of the wall 11 in a radial plane of the lid 2. The annular part 34 and the reinforcement ribs 17 serve for reinforcement of the lid bottom 10. In addition, a container 1 stacked on the lid 2 has a distance from the lid bottom 10 so that in the region of the free spaces formed between the ribs 17, the annular part 34, and the lid wall 11 an air circulation and discharge of hot air is ensured between the receptacles stacked on each other.

The free rims 37 of the reinforcement ribs 17 can also be recessed in relation to the free rim 35 of the wall 11.

In embodiments, five reinforcement ribs 17 are provided distributed uniformly about the circumference. Depending on the application situation, the number of reinforcement ribs 17 can vary. Since they do not project axially past the wall 11, the receptacles can be stacked on each other without a problem.

The reinforcement ribs 17 and the annular part 34 have only a minimal thickness. Despite of this, they impart to the lid 2 a high strength so that also receptacles with relatively high weight can be stacked.

The wall 11 in accordance with the preceding embodiment is provided with the venting openings 3 (FIG. 17) which are advantageously arranged uniformly distributed about the circumference of the wall 11 and are designed in accordance with the preceding embodiment.

In contrast to the preceding embodiment, the venting regions 14 are not provided in the wall 11 of the lid 2 but in the closure part 4.

The guide 36 on the top side of the bottom 10 extends coaxially to the wall 11 at a minimal distance thereto. As illustrated in FIG. 18, the guide 36 is formed by part-circularly curved guide sections 36' which are positioned at a distance one behind the other, which, in turn, are formed by two parallel extending webs 36a, 36b. A labeling part 38 for labeling the contents contained in the container 1 engages between the webs 36a, 36b.

The labeling part 38 has an L-shape and is held at the outer side of the closure part 4. A short leg 38a of the labeling part 38 engages across the wall 11 of the lid 2 and engages with a rim angled approximately at a right angle between the webs 36a, 36b of the guide 36. The angled rim is curved in accordance with the guide 36.

Corresponding to the conical wall 11 of the lid 2, the annular closure part 4 has a conical wall 20 in which the venting openings 18 are arranged. At one end of the venting openings 18, the venting region 14 adjoins, respectively, which is comprised of narrow slot-shaped openings 15 which are positioned in circumferential direction at a minimal distance behind each other.

In the region between some of the venting openings 18, the ribs 24 are provided which extend axially across the height of the wall 20 and serve as grip as well as wall reinforcement.

In accordance with the preceding embodiment, the closure part 4 which surrounds the wall 11 of the lid 2 and rests with its wall 20 against it can be rotated about the axis of the lid 2 into different positions.

In the closed position, the wall sections 39 positioned between neighboring venting openings 18 completely close the venting openings 3 of the lid 2.

In a second position of the closure part 4, only the venting regions 15 are within the region of the venting openings 3 so that a limited air exchange between the container interior and the environment takes place.

The closure part 4 can be rotated such that its venting openings 18 completely release the venting opening 3 of the lid 2 in a third position. Advantageously, the venting openings 3, 18, as in the preceding embodiment, have the same circumferential contour so that a maximum air exchange can take place.

It is advantageous when the three positions of the closure part 4 are determined by corresponding detents. For this purpose, at the top rim of the wall 20 of the closure part 4 three recesses 40 are provided (FIG. 21) having associated therewith a corresponding projection 41 at the top rim of the wall 11 of the lid 2. The number and arrangement of the recesses 40 is variable, of course.

As in the preceding embodiment, by means of the detents 40, 41, the size of the passages for the air can be adjusted very simply.

In FIGS. 18 and 21, only one detent 40, 41 is illustrated as it is provided for complete release of the openings 3, for example. The detents 40, 41 for the described three positions of the closure part 4 are a particularly preferred embodiment.

As can be seen in FIG. 18, a plurality of detents 40, 41 are distributed about the circumference of the lid 2 so that the adjustment of the closure part 4 is particularly reliable.

As needed, a plurality of the described containers 1 and of the lids 2 can be stacked on each other by themselves and stored, for example, for a space-saving storage.

The lid 2 and the closure part 4 are advantageously each produced as one piece of plastic material, advantageously by injection molding. As materials, all plastic materials as well as other materials, for example, aluminum or the like, are conceivable which are approved with respect to food law.

What is claimed is:

1. A receptacle comprising:
a container comprising a fill opening and configured to receive via the fill opening food products producing steam and a condensate when heated;
a lid comprising a closed lid bottom and an annular cylindrical wall connected to the closed lid bottom, wherein the annular cylindrical wall comprises at least one lid opening configured to allow the steam to escape to prevent the condensate from forming in the container, wherein the lid is a part separate from the container, wherein the lid is configured to attach to a rim of the fill opening of the container to close the container and the lid is removable from the container in order to fill the container and empty the container, wherein the annular cylindrical wall of the lid projects partially past the closed lid bottom in a direction away from the container;
a closure part disposed on the lid and connected by a form fit connection to the lid, wherein the closure part does not cover the lid bottom and is configured to close the at least one lid opening, wherein the closure part comprises an annular cylindrical wall surrounding the annular cylindrical wall of the lid, wherein the annular cylindrical wall of the closure part comprises at least one closure part opening;
wherein the lid and the closure part are adjustable relative to each other to align the at least one closure part opening and the at least one lid opening at least partially with each other to release the at least one lid opening so that the steam escapes from the container.

2. The receptacle according to claim 1, wherein the lid comprises at least one venting region configured to be closed by the closure part, or wherein the closure part comprises at least one venting region configured to be closed by the lid.

3. The receptacle according to claim 2, wherein the venting region of the lid is provided in the annular cylindrical wall of the lid, or wherein the venting region of the closure part is provided in the annular cylindrical wall of the closure part.

4. The receptacle according to claim 1, wherein the at least one lid opening and/or the at least one closure part opening has an oval contour.

5. The receptacle according to claim 4, wherein the at least one lid opening extends in a circumferential direction of the annular cylindrical wall of the lid.

6. The receptacle according to claim 4, wherein the at least one closure part opening extends in a circumferential direction of the annular cylindrical wall of the closure part.

7. The receptacle according to claim 1, wherein the lid comprises one or more venting regions disposed in the annular cylindrical wall of the lid and configured to be closed by the closure part, wherein at least one reinforcement part is provided in a region between at least one of the at least one lid opening and at least one of the one or more venting regions in the annular cylindrical wall of the lid, wherein the at least one reinforcement part is a rib-shaped reinforcement arranged at an inner side of the annular cylindrical wall, wherein the rib-shaped reinforcement extends substantially across an entire height of the annular cylindrical wall.

8. The receptacle according to claim 1, wherein the annular cylindrical wall of the closure part comprises a first rim at an end of the annular cylindrical wall facing the container, wherein the first rim of the annular cylindrical wall of the closure part comprises a circumferential annular projection, extending in a circumferential direction all around the first rim and engaging a circumferential annular groove in an outer side of the annular cylindrical wall of the lid, wherein the circumferential annular groove extends in the circumferential direction all around the outer side and is open radially outwardly, wherein the circumferential annular projection projects radially inwardly into the circumferential annular groove in a form fit connection.

9. The receptacle according to claim 1, wherein the annular cylindrical wall of the lid comprises rib-shaped reinforcements arranged at an inner side of the annular cylindrical wall and spaced apart from each other in a circumferential direction of the annular cylindrical wall, wherein the rib-shaped reinforcements extend substantially across an entire height of the annular cylindrical wall.

10. The receptacle according to claim 1, wherein the closed bottom of the lid is provided with reinforcement parts, wherein the reinforcement parts are positioned at an outer side of the closed bottom and radiate inwardly away from the annular cylindrical wall of the lid.

11. The receptacle according to claim 1, wherein the closed bottom of the lid comprises rib-shaped reinforcement parts and an annular reinforcement part, wherein the rib-shaped reinforcement parts extend radially relative to the annular reinforcement part.

12. The receptacle according to claim 1, wherein the annular cylindrical wall of the lid comprises reinforcement parts at an inner side thereof, wherein the reinforcement parts are axially extending ribs extending substantially across an entire height of the annular cylindrical wall of the lid.

13. The receptacle according to claim 1, wherein the annular cylindrical wall of the closure part comprises an inwardly bent rim at an end of the annular cylindrical wall of the closure part facing away from the container, wherein the inwardly bent rim extends in a circumferential direction all around the annular cylindrical wall of the closure part and rests on a rim of the lid.

14. The receptacle according to claim 1, wherein the closed bottom of the lid is curved convexly downwardly in a direction toward the container.

15. The receptacle according to claim 1, wherein the closure part is secured against rotation in defined positions relative to the lid by a plurality of detents.

16. The receptacle according to claim 15, wherein the plurality of detents are formed by one or more recesses and one or more projections positioned at a circumferential distance from each other, respectively.

17. The receptacle according to claim 8, wherein the annular cylindrical wall of the closure part comprises a second rim arranged at an end of the annular cylindrical wall of the closure part facing away from the container and projecting past the closed lid bottom, wherein the second rim is inwardly bent and forms a circumferentially extending raised rim extending above the lid bottom and surrounding a recess of the lid defined by the closed lid bottom and the annular cylindrical wall projecting partially past the closed lid bottom in a direction away from the container.

18. A receptacle comprising:
a container configured to receive products producing a condensate when heated;
a lid comprising an annular wall and at least one lid opening in the annular wall, wherein the lid is a part separate from the container, wherein the lid is configured to attach to a rim of the container to close the container and is removable from the container in order to fill the container or empty the container;
a closure part disposed on the lid and comprising an annular wall surrounding the annular wall of the lid;
wherein the lid comprises a bottom and a raised rim projecting past the bottom in a direction away from the container, wherein the raised rim and the bottom define a recess of the lid, wherein the recess is configured to stack a further receptacle on the lid, wherein the raised rim provides an anti-slide protection for the further receptacle stacked in the recess, wherein the closure part is configured such that the bottom of the lid is not covered by the closure part and the recess is accessible for stacking;
wherein the lid and the closure part are adjustable relative to each other for opening and closing the at least one lid opening even when a further receptacle is stacked on the bottom of the lid.

19. The receptacle according to claim 1, wherein the form fit connection is comprised of an annular groove disposed in an outer wall of the annular cylindrical wall of the lid and further comprises an annular projection disposed on the annular cylindrical wall of the closure part and engaging the annular groove.

20. The receptacle according to claim 9, wherein the lid bottom of the lid comprises radial reinforcement parts arranged at a distance from each other.

* * * * *